United States Patent
Bai et al.

(10) Patent No.: US 11,857,897 B2
(45) Date of Patent: Jan. 2, 2024

(54) GAS COOLING-SCRUBBING APPARATUS AND METHOD

(71) Applicant: East China University of Science and Technology, Shanghai (CN)

(72) Inventors: Zhishan Bai, Shanghai (CN); Fuwei Lv, Shanghai (CN); Xiao Dong, Shanghai (CN)

(73) Assignee: East China University of Science and Technology, Shanghai (CN)

( * ) Notice: Subject to any disclaimer, the term of this patent is extended or adjusted under 35 U.S.C. 154(b) by 0 days.

(21) Appl. No.: 17/577,177

(22) Filed: Jan. 17, 2022

(65) Prior Publication Data
US 2023/0090215 A1    Mar. 23, 2023

(30) Foreign Application Priority Data
Sep. 17, 2021 (CN) .......................... 202111092575.7

(51) Int. Cl.
*B04C 9/00* (2006.01)
*B01D 21/26* (2006.01)
(Continued)

(52) U.S. Cl.
CPC ....... *B01D 21/267* (2013.01); *B01D 21/0012* (2013.01); *B04C 3/06* (2013.01); *B04C 9/00* (2013.01); *B04C 2009/004* (2013.01)

(58) Field of Classification Search
CPC .............. B01D 21/267; B01D 21/0012; B01D 19/0057; B01D 45/12; B01D 50/20;
(Continued)

(56) References Cited

U.S. PATENT DOCUMENTS 3,667,191 A * 6/1972 Prince .................... B01D 47/10
    95/155
3,771,289 A * 11/1973 Skoli ..................... B01D 47/06
    261/153
(Continued)

FOREIGN PATENT DOCUMENTS

CN    108434916    8/2018
CN    108905475    11/2018
(Continued)

OTHER PUBLICATIONS

Machine Translation of CN108434916, 10 pages.
Machine Translation of CN108905475, 8 pages.
Machine Translation of CN212357159, 12 pages.

*Primary Examiner* — Dung H Bui
(74) *Attorney, Agent, or Firm* — HOVEY WILLIAMS LLP

(57) ABSTRACT

The present disclosure relates to a gas cooling-scrubbing apparatus and an associated method. There is provided a gas cooling-scrubbing apparatus, comprising: a cyclone jet scrubbing unit, a spray scrubbing unit, a filtering spray unit, and a coalescing dehydration unit, wherein the cyclone jet scrubbing unit comprises a cyclone jet scrubbing monopipe (2), a cyclone jet cooling water pipe (15), a cyclone jet pipe plate (14) and a cyclone jet overflow pipe (13); wherein the spray scrubbing unit comprises a spray filtering pipe (3), a spray pipe plate (11), a spray overflow pipe (12), a scrubbing nozzle (9) and a scrubbing nozzle water pipe (10); wherein the filtering spray unit comprises a filtering bed (4), a spray head (7) and a spray water pipe (8); and wherein the coalescing dehydration unit comprises a coalescing bed (5). There is also provided a gas cooling-scrubbing method.

9 Claims, 4 Drawing Sheets

(51) Int. Cl.
 *B01D 21/00* (2006.01)
 *B04C 3/06* (2006.01)
(58) Field of Classification Search
 CPC ....... B04C 3/06; B04C 9/00; B04C 2009/004; B04C 3/04
 See application file for complete search history.

(56) References Cited

U.S. PATENT DOCUMENTS

| | | | | |
|---|---|---|---|---|
| 3,853,505 A * | 12/1974 | Tretter, Jr. | ............. | B01D 47/06 95/188 |
| 4,157,250 A * | 6/1979 | Regehr | ................. | B01D 45/16 55/443 |
| 4,204,847 A * | 5/1980 | Ko | ......................... | B01D 45/08 55/440 |
| 4,251,228 A * | 2/1981 | Muenger | .................. | C10J 3/845 95/271 |
| 4,272,499 A * | 6/1981 | Cason | .................... | B01D 47/10 423/243.08 |
| 4,455,224 A * | 6/1984 | Kaiser | ........................ | B04C 9/00 209/729 |
| 4,601,731 A * | 7/1986 | Michelson | ............. | B01D 45/08 55/440 |
| 4,767,424 A * | 8/1988 | McEwan | ................ | B01D 45/16 55/456 |
| 5,203,894 A * | 4/1993 | Chowaniec | ............ | B01D 45/08 55/440 |
| 5,230,725 A * | 7/1993 | Chowaniec | ............ | B01D 45/16 55/443 |
| 5,464,459 A * | 11/1995 | VanBuskirk | ........... | B01D 45/16 55/440 |
| 6,083,302 A * | 7/2000 | Bauver, II | ............ | B01D 53/504 55/440 |
| 6,213,030 B1 | 4/2001 | Robertson | ................. | F23G 5/20 110/259 |
| 7,202,389 B1 * | 4/2007 | Brem | ...................... | C10B 49/12 585/242 |
| 7,488,361 B2 * | 2/2009 | Larnholm | .............. | B01D 50/20 55/318 |
| 7,833,298 B2 * | 11/2010 | Larnholm | .............. | B01D 45/12 55/482 |
| 9,248,392 B2 * | 2/2016 | Brown | ................. | B01D 46/003 |
| 10,987,621 B1 * | 4/2021 | Lee | ........................ | B01D 53/79 |
| 11,083,975 B2 * | 8/2021 | Salazar | .................. | B01D 3/008 |
| 2005/0011170 A1 * | 1/2005 | Christiansen | ........... | B04C 5/103 55/345 |
| 2005/0060970 A1 * | 3/2005 | Polderman | ............. | B01D 45/08 55/320 |
| 2007/0044437 A1 * | 3/2007 | Larnholm | ............... | B01D 45/16 55/319 |
| 2009/0183632 A1 * | 7/2009 | Peltonen | ................ | B01D 47/10 95/151 |
| 2010/0074828 A1 * | 3/2010 | Singh | ...................... | B03C 3/017 423/432 |
| 2011/0159596 A1 * | 6/2011 | Keinan | ................. | G01N 1/2211 422/86 |
| 2012/0067214 A1 * | 3/2012 | Ribera Salcedo | ........ | B03C 3/49 96/57 |
| 2013/0239810 A1 * | 9/2013 | Yang | ...................... | B01D 53/14 95/196 |
| 2013/0247764 A1 * | 9/2013 | Kvamsdal | .......... | B01D 19/0057 96/208 |
| 2015/0076037 A1 * | 3/2015 | Yamamoto | ................ | B03B 9/00 209/11 |
| 2015/0165364 A1 * | 6/2015 | Ollila | ..................... | B01D 47/10 96/306 |
| 2015/0190744 A1 * | 7/2015 | Grave | .................... | B01D 47/14 95/219 |
| 2015/0290560 A1 * | 10/2015 | Høydal | .............. | B01D 19/0042 95/243 |
| 2016/0038854 A1 * | 2/2016 | Yang | ........................ | B01D 3/06 96/195 |
| 2016/0166951 A1 * | 6/2016 | Hammad | .......... | B01D 53/1425 95/261 |
| 2016/0184758 A1 * | 6/2016 | Soons | ................... | C07C 273/02 118/69 |
| 2016/0243487 A1 * | 8/2016 | Kim | .......................... | A23F 5/04 |
| 2016/0339383 A1 * | 11/2016 | Naito | .................... | B01D 53/78 |
| 2018/0126318 A1 * | 5/2018 | Schubert | ............. | B01D 47/027 |
| 2018/0169577 A1 * | 6/2018 | McClelland | ....... | B01D 53/1406 |
| 2019/0009282 A1 * | 1/2019 | Damkjær | ................ | B04C 5/04 |
| 2019/0151766 A1 * | 5/2019 | Salazar | ................. | B01D 45/12 |
| 2019/0336904 A1 * | 11/2019 | Choi | ..................... | B01D 45/16 |
| 2020/0198751 A1 * | 6/2020 | Watten | ................ | A01M 21/043 |
| 2020/0330914 A1 * | 10/2020 | Culubret | ................ | B01D 50/40 |
| 2021/0322917 A1 * | 10/2021 | Jeong | .................... | B01D 47/14 |
| 2022/0032226 A1 * | 2/2022 | Tubergen | ................ | B04C 5/20 |
| 2022/0071461 A1 * | 3/2022 | Tung | .................... | B01D 50/40 |
| 2022/0126234 A1 * | 4/2022 | Jeong | .................... | B01D 46/10 |

FOREIGN PATENT DOCUMENTS

| | | | | |
|---|---|---|---|---|
| CN | 212357159 | | 1/2021 | |
| KR | 102148218 B1 * | | 8/2020 | ............... B04C 9/00 |

* cited by examiner

GAS COOLING-SCRUBBING APPARATUS AND METHOD

RELATED APPLICATIONS

This application claims priority to Chinese Patent Application No. 202111092575.7, entitled GAS COOLING-SCRUBBING APPARATUS AND METHOD, filed Sep. 17, 2021, incorporated by reference herein.

TECHNICAL FIELD

The present disclosure pertains to the field of chemical applications, and relates to a gas cooling-scrubbing apparatus and an associated method, particularly to a treatment method for cooling and scrubbing gas by cyclone jet scrubbing, spray scrubbing, filtering spray and coalescing separation technologies.

BACKGROUND ART

Removal of solid particles from a process gas can ensure steady operation of subsequent equipment on one hand, and can reduce the concentration of particulate pollutants in the atmosphere effectively on the other hand. For example, the flexible coking gas produced by a flexicoking apparatus carries coke powder. Fine coke powder particles enter downstream apparatus such as column plates, heat exchangers, mixers, etc., and wear and clog the downstream apparatus, so that the pressure drop of a carbonyl sulfide converter is increased, and its operating life is thus shortened. The high-temperature flue gas emitted by thermal power plants contains a large number of particulate pollutants, which is one of the main sources of pollutants in the air.

However, the existing gas scrubbing technologies do not have a satisfactory effect on the removal of fine particles in the gas. For example, Chinese Patent CN108434916B discloses a scrubbing system suitable for high dust content gas. The system is provided with a pretreater, a filtration device, and a scrubbing tower, and impurities are removed from the gas by means of the interception action of a water film. Chinese Patent Application CN108905475A discloses a cyclone scrubbing apparatus for purification of dusty gas. The apparatus comprises a cyclone scrubber, an interception adsorption device, a scrubbing spray pipe, and a water mist separation device. It removes solid particles from the gas by spraying, adsorption and cyclone scrubbing. Chinese Patent CN212357159U discloses a high-temperature dust-containing gas scrubbing and cooling device and a gasification furnace. The high-temperature dust-containing gas is first cooled by scrubbing and cooling pipes, and is conveyed into a bubble tower for dust removal.

The above gas scrubbing technologies can remove particle impurities of a size that is 20 μm or larger in the gas, but has a poor removal effect on fine particle impurities smaller than 20 μm, and thus cannot meet the increasingly stringent environmental protection requirements. At the same time, in the industrial production process, when impurities are being removed from dusty gas, a portion of the process needs cooling, and a gas condensing device is also susceptible to clogging due to incomplete removal of fine particles.

Therefore, there is an urgent need in the art to develop a new, economical, efficient, and safe gas cooling-scrubbing device and an associated method.

SUMMARY

The present application provides a novel gas cooling-scrubbing device and a method, thereby solving the problems existing in the prior art.

In one aspect, the present disclosure provides a gas cooling-scrubbing apparatus, comprising: a cyclone jet scrubbing unit, a spray scrubbing unit, a filtering spray unit, and a coalescing dehydration unit, wherein the cyclone jet scrubbing unit comprises a cyclone jet scrubbing monopipe, a cyclone jet cooling water pipe, a cyclone jet pipe plate and a cyclone jet overflow pipe;

the spray scrubbing unit comprises a spray filtering pipe, a spray pipe plate, a spray overflow pipe, a scrubbing nozzle and a scrubbing nozzle water pipe;

the filtering spray unit comprises a filtering bed, a spray head and a spray water pipe; and the coalescing dehydration unit comprises a coalescing bed.

In a preferred embodiment, the cyclone jet scrubbing monopipe includes a jetting region and a cyclone region. The jetting region is provided with a cyclone jet inlet, a nozzle, a contraction section, a mixing section, and an diffuser section, wherein the contraction section has an angle of greater than 10° and less than 45°; the diffuser section has an angle of greater than 2° and less than 20°; and the nozzle has a spray angle of greater than 10° and a spray range covering the entire contraction section. The cyclone region is provided with a tangential inlet, a cyclone pipe, a sedimentation outlet, a cyclone pipe, and a bubble cap.

In another preferred embodiment, the spray filtering pipe is provided with a spray inlet, a filtering module, and a spray port, wherein the spray port is an expanding outlet having an expanding angle of less than or equal to 10°, and the filtering module has a filter fineness of 10-200 mesh.

In another preferred embodiment, the filtering bed has a filter fineness of 200-2000 mesh.

In another preferred embodiment, the scrubbing nozzle and the spray filtering pipe are arranged in one-to-one correspondence and concentrically; the scrubbing nozzle has a spray angle of greater than 20°; a distance from the scrubbing nozzle to the spray port is greater than an outlet diameter D of the spray port; and a spray range covers the whole spray port of the spray filtering pipe.

On the other hand, the present disclosure provides a gas cooling-scrubbing method, comprising the following steps:

(a) feeding a dusty gas into a cyclone jet scrubbing unit from a gas phase inlet, wherein the gas enters a jetting region of a cyclone jet scrubbing monopipe from a cyclone jet inlet, and is fully mixed with and cooled by scrubbing water sprayed from a nozzle in a contraction section, a mixing section and an diffuser section; wherein after solid particles are captured by atomized droplets to form a liquid-solid combinant, the combinant enters a cyclone region of the cyclone jet scrubbing monopipe from a tangential inlet; wherein the liquid-solid combinant sinks under an action of centrifugal force in a cyclone pipe and is discharged from a sedimentation outlet; and wherein the gas treated by cyclone jetting rises, is discharged from a cyclone jet pipe and enters a spray scrubbing unit;

(b) allowing the gas treated by cyclone jetting to enter a spray filtering pipe via a spray inlet in the spray scrubbing unit, wherein after the gas is further filtered by a filtering module, the gas is discharged upward from a spray port at a reduced rate; wherein high-pressure scrubbing water is sprayed downward from a scrubbing nozzle, and collides with the rising gas to further cool and scrub the gas; and wherein at the same time, tiny solid particles in the filtering module are detached from the module by backwash of the high-pressure scrubbing water to increase a service life of the filtering module;

(c) allowing the gas treated by spray scrubbing in step (b) to enter a filtering spray unit, wherein a spray head disposed above a filtering bed sprays cooling-scrubbing water downward to further reinforce a cooling-scrubbing effect; and (d) allowing the gas treated by filtering spray in step (c) to enter a coalescing dehydration unit, wherein a coalescing bed captures tiny droplets in the gas to prevent the gas phase from entraining droplets into a downstream device, and the treated gas is discharged from a gas phase outlet.

In a preferred embodiment, waste scrubbing water is discharged from a liquid discharge port; circulating water flows out through a circulating water outlet; the solid particles in the circulating water are filtered through a filter; and at the same time, fresh water is replenished through a circulating water outlet pipeline.

In another preferred embodiment, a liquid phase at a bottom of the cyclone jet scrubbing unit forms a liquid seal at the sedimentation outlet of the cyclone jet scrubbing monopipe to drive the gas to enter the cyclone jet scrubbing monopipe from the cyclone jet inlet; a gas treating capacity of the cyclone jet scrubbing monopipe is not more than 1000 $m^3/h$; and a fresh water supplement is 0.5-5 vol % of a gas intake.

In another preferred embodiment, a flow volume of scrubbing water in the nozzle of the cyclone jet scrubbing monopipe is 0.2-2 vol % of a volume of the gas to be treated; a flow volume of high-pressure scrubbing water in the scrubbing nozzle of the spray scrubbing unit is 1-5 vol % of the volume of the gas to be treated; and a flow volume of the cooling-scrubbing water in the spray head of the filtering spray unit is 2-10 vol % of the volume of the gas to be treated.

Beneficial Effects:

The main advantages of the apparatus and method of the invention include:

(1) By means of the jet principle, the cyclone jet scrubbing monopipe allows the solid particles in the gas to collide with the water droplets atomized by the nozzle and be intercepted and trapped. At the same time, the temperature is decreased by water cooling. Owing to the density difference between the gas phase and the liquid phase, the liquid-solid combinant is separated from the gas under the action of the centrifugal force field generated by the high-speed rotation of the gas in the cyclone pipe.

(2) The internal filtering module in the spray filtering pipe filters the residual fine particles in the gas phase, and at the same time, the scrubbing nozzle disposed above the spray port enables countercurrent contact of the scrubbing water with the gas to reinforce scrubbing and prevent the filtering module from clogging.

(3) Depending on the volume of gas to be treated, the apparatus of the present disclosure may be provided with various numbers of cyclone jet scrubbing monopipes and jet filtering pipes. The recycling of scrubbing water in the apparatus reduces the operating cost of the apparatus effectively, and can bring good economic benefits to enterprises. The apparatus is suitable for popularization and application in industrial installations for cooling and scrubbing high-temperature dusty gas.

DESCRIPTION OF THE DRAWINGS

The accompanying drawings are provided for better understanding of the disclosure. They constitute a part of the specification for further explanation of the disclosure without limiting the disclosure.

In the drawings, the components are not necessarily drawn to scale.

Figure 1:
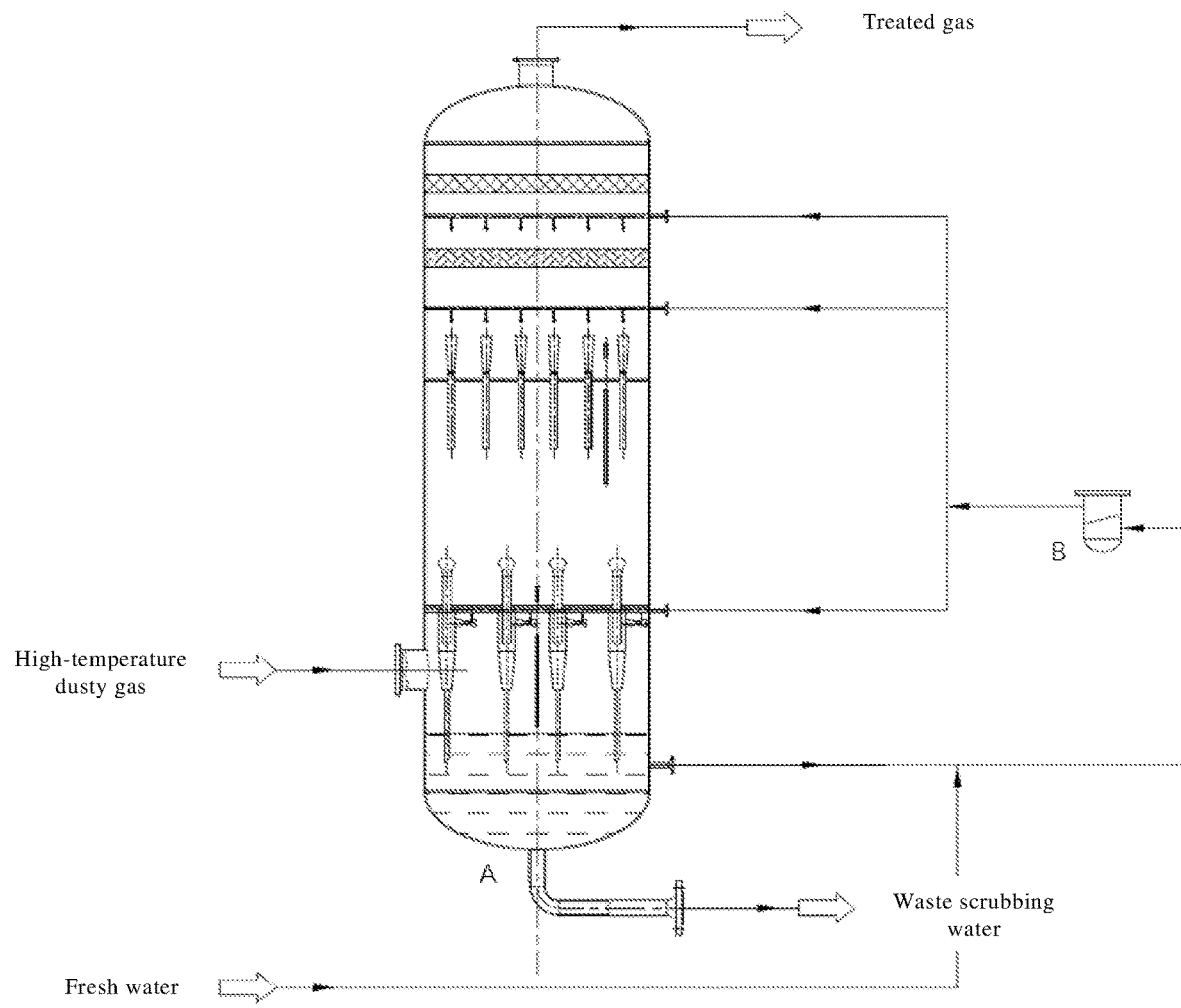
FIG. 1 is a schematic flow chart of a gas cooling-scrubbing process according to a preferred embodiment of the present disclosure.

In the drawings, the reference numbers represent the following apparatus and internal parts respectively:

A: gas cooling-scrubbing apparatus; B: filter; 1: gas phase inlet; 2: cyclone jet scrubbing monopipe; 3: spray filtering pipe; 4: filtering bed; 5: coalescing bed; 6: gas phase outlet; 7: spray head; 8: spray water pipe; 9: scrubbing nozzle; 10: scrubbing nozzle water pipe; 11: spray pipe plate; 12: spray overflow pipe; 13: cyclone jet overflow pipe; 14: cyclone jet pipe plate 15: cyclone jet cooling water pipe; 16: circulating water outlet; 17: liquid discharge port; 2-1: cyclone jet inlet; 2-2: nozzle; 2-3: contraction section; 2-4: mixing section; 2-5: diffuser section; 2-6: tangential inlet; 2-7: bubble cap; 2-8: cyclone jet pipe; 2-9: cyclone pipe; 2-10: sedimentation outlet; 3-1: spray inlet; 3-2: filtering module; 3-3: spray port.

DETAILED DESCRIPTION

In order to make the technical problem to be solved by the present disclosure, the technical solution and the beneficial effects clearer, the present invention is now further illustrated with reference to the following accompanying drawings and embodiments. It should be understood that the specific embodiments described herein are only used to explain the present disclosure, not to limit the present disclosure.

After studying the collision mechanism of solid particles and water droplets, the inventor of the present application have discovered that there are three main ways for solid particles to contact and coalesce with a liquid phase: (1) inertial deposition of larger particles; (2) capture and interception by water droplets in the direction of the gas flow; and (3) the diffusion mechanism of smaller particles due to the action of the circumferential turbulence field. In order to reinforce the gas cooling-scrubbing effect and enhance the separation efficiency, the cyclone jet scrubbing, spray scrubbing, filtering spray and coalescing separation technologies may be used. Based on the above discoveries, the present invention has been accomplished.

The technical concept of the present invention is as follows:

The gas cooling-scrubbing apparatus according to the present disclosure comprises: a cyclone jet scrubbing unit, a spray scrubbing unit, a filtering spray unit and a coalescing dehydration unit. After a dusty gas is treated by the apparatus, solid particles are captured by the scrubbing water to form a liquid-solid combinant which is separated from the gas. The treated gas is discharged from a top exhaust port, and the waste scrubbing water is discharged from a liquid discharge port. The circulating water in the apparatus flows out from a circulating water outlet, and the solid particles in the circulating water are filtered through a filter. At the same time, fresh water is replenished to the apparatus through a circulating water outlet pipeline. While the tiny solid particles in the gas are separated, the gas is cooled by water. The apparatus is suitable for popularization and application in the field of gas scrubbing.

First, the dusty gas enters the cyclone jet scrubbing unit from the gas phase inlet, enters the jetting region of the cyclone jet scrubbing monopipe from the cyclone jet inlet, and is fully mixed with the scrubbing water sprayed from the nozzle in the contraction section, the mixing section and the diffuser section. After the solid particles are captured by the atomized droplets to form a liquid-solid combinant, the combinant enters the cyclone region from the tangential inlet. Under the action of centrifugal force in the cyclone pipe, the liquid-solid combinant sinks and is discharged from the sedimentation outlet, while the gas treated by cyclone jetting rises, and is discharged into the spray scrubbing unit through the cyclone jet pipe. In the spray scrubbing unit, the gas treated by cyclone jetting enters the jet filtering pipe from the spray inlet, is further filtered by the filtering module, and then discharged upward from the spray port at a reduced rate. The high-pressure scrubbing water is sprayed downward through the scrubbing nozzle to collide with the rising gas, so as to further cool and scrub the gas. At the same time, the tiny solid particles in the filtering module are detached from the module by the backwash of the high-pressure scrubbing water to prolong the service life of the filtering module. The gas treated by spray scrubbing enters the filtering spray unit, wherein the spray head disposed above the filtering bed sprays cooling-scrubbing water downward to further reinforce the cooling-scrubbing effect. The gas treated by filtering spray enters the coalescing dehydration unit, wherein the coalescing bed can capture the tiny droplets in the gas effectively to prevent the gas phase from entraining droplets into a downstream device, and the treated gas is discharged from the gas phase outlet.

Now, specific embodiments of the present disclosure will be described with reference to the accompanying drawings.

FIG. 1 is a schematic flow chart of a gas cooling-scrubbing process according to a preferred embodiment of the present disclosure. As shown in FIG. 1, a high-temperature dusty gas enters a gas cooling-scrubbing apparatus A from a gas inlet. Solid particles are captured by scrubbing water to form a liquid-solid combinant which is separated from the gas. The treated gas is discharged from an exhaust port on the top of the apparatus, and the waste scrubbing water is discharged from a liquid discharge port. The circulating water in the apparatus flows out from a circulating water outlet, and the solid particles in the circulating water are filtered through a filter B. At the same time, fresh water is replenished to the apparatus through a circulating water outlet pipeline.

Figure 2:
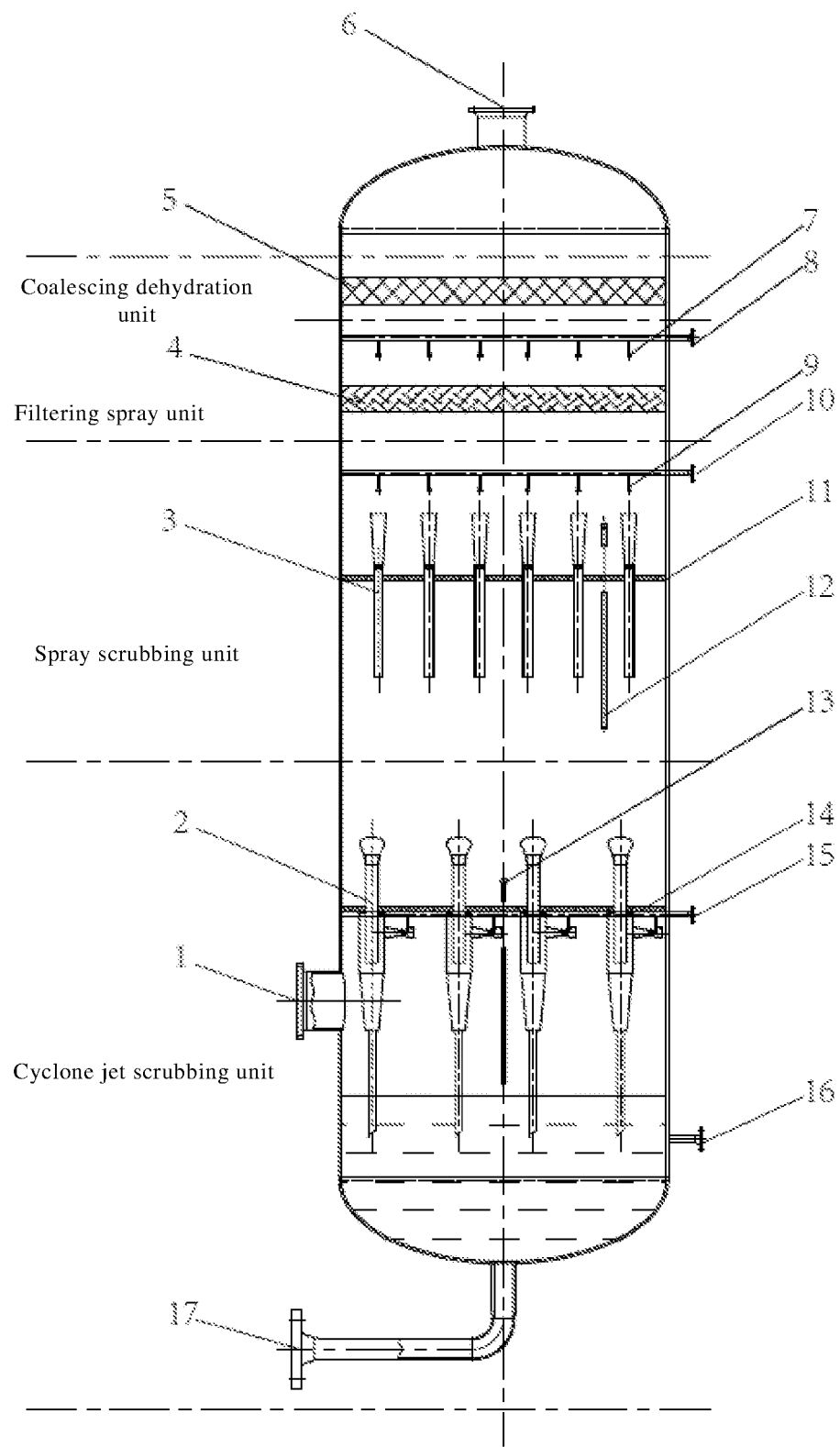
FIG. 2 is a schematic view of a gas cooling-scrubbing apparatus according to a preferred embodiment of the present disclosure.

FIG. 2 is a schematic view of a gas cooling-scrubbing apparatus according to a preferred embodiment of the present disclosure. As shown in FIG. 2, a high-temperature dusty gas first enters a cyclone jet scrubbing unit from a gas phase inlet 1, wherein the cyclone jet scrubbing unit comprises a cyclone jet scrubbing monopipe 2, a cyclone jet cooling water pipe 15, a cyclone jet pipe plate 14 and a cyclone jet overflow pipe 13. The gas treated by cyclone jetting rises and enters a spray scrubbing unit, wherein the spray scrubbing unit comprises a spray filtering pipe 3, a spray pipe plate 11, a spray overflow pipe 12, a scrubbing nozzle 9 and a scrubbing nozzle water pipe 10. The gas treated by spray scrubbing enters a filtering spray unit, wherein the filtering spray unit comprises a filtering bed 4, a spray head 7 and a spray water pipe 8. The gas treated by filtering spray enters a coalescing dehydration unit, wherein the coalescing dehydration unit comprises a coalescing bed 5. The treated gas is discharged from a gas phase outlet 6; the waste scrubbing water is discharged from a liquid discharge port 17; and the circulating water in the apparatus flows out from a circulating water outlet 16.

Figure 3:
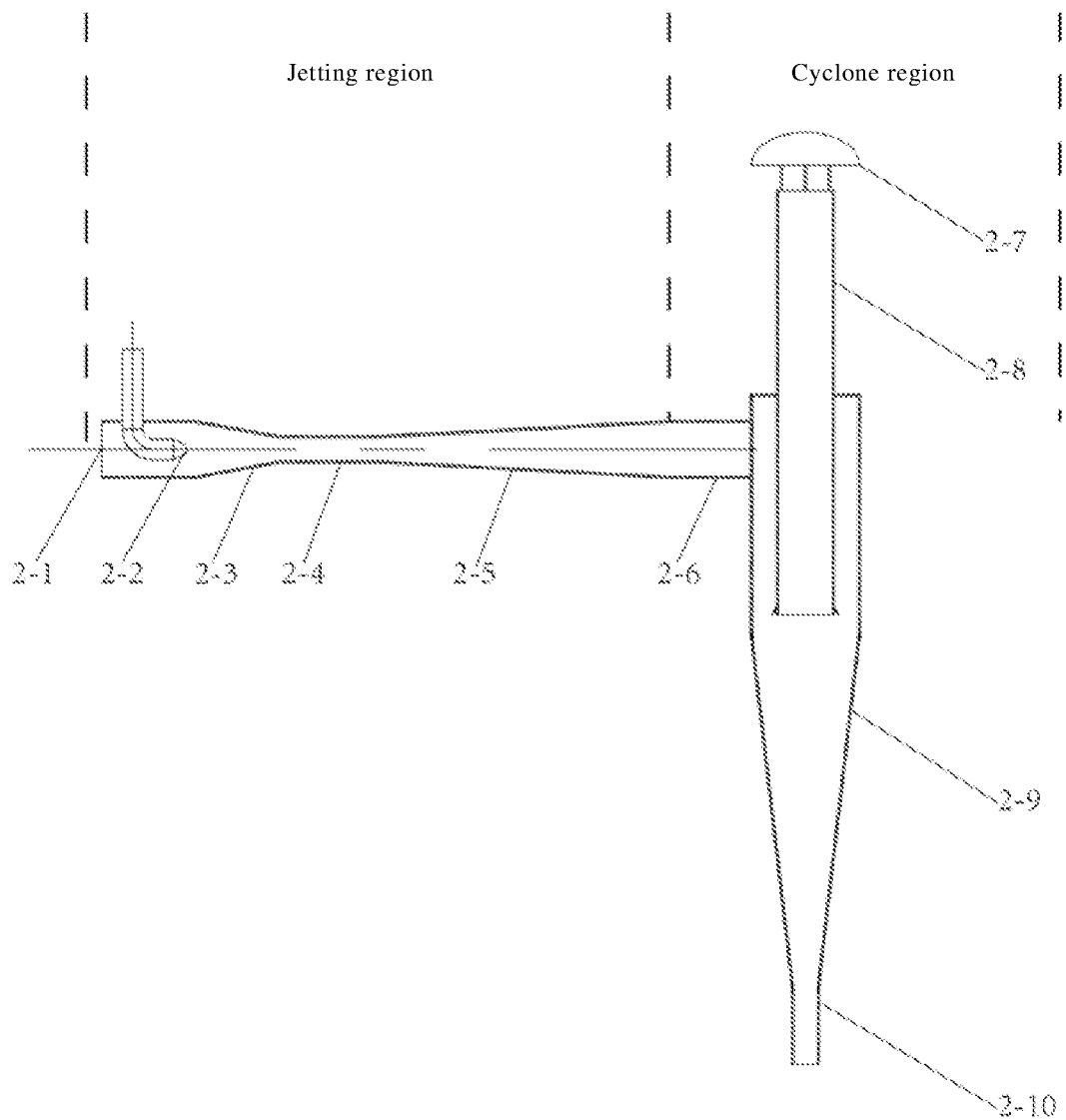
FIG. 3 is a schematic view of a cyclone jet scrubbing monopipe according to a preferred embodiment of the present disclosure.

FIG. 3 is a schematic view of a cyclone jet scrubbing monopipe according to a preferred embodiment of the present disclosure. As shown in FIG. 3, the cyclone jet scrubbing monopipe includes a jetting region and a cyclone region. The jetting region is provided with a cyclone jet inlet 2-1, a nozzle 2-2, a contraction section 2-3, a mixing section 2-4 and an diffuser section 2-5. The cyclone region is provided with a tangential inlet 2-6, a cyclone pipe 2-9, a sedimentation outlet 2-10, a cyclone jet nozzle 2-8 and a bubble cap 2-7. By means of the jet principle, the cyclone jet scrubbing monopipe allows the solid particles in the gas to collide with the water droplets atomized by the nozzle and be intercepted and trapped. At the same time, the temperature is decreased by water cooling. After the solid particles are captured during the spray scrubbing, the liquid-solid combinant enters the inside of the cyclone pipe from the tangential inlet under the action of a pressure, and rotates at a high speed, so that the gas flow is accelerated, and a spiral flow state is developed. Due to further reduction of the cross-section of the flow passage, the cyclone speed continues to increase, forming a stable centrifugal force field inside the cyclone pipe. The gas phase with a light specific gravity coalesces into a gas core in the central zone of the cyclone pipe, and is discharged from the cyclone jet pipe. The liquid-solid combinant with a heavier specific gravity is discharged from the sedimentation outlet, thereby realizing rapid separation of coke-containing water droplets from flexible coking gas.

Figure 4:
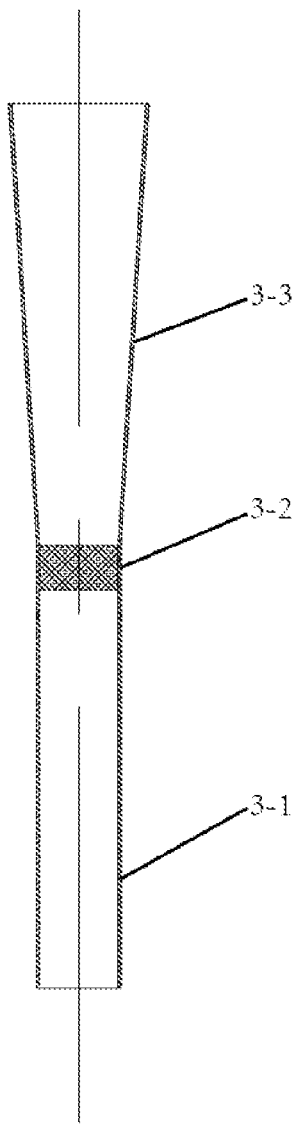
FIG. 4 is a schematic view of a spray filtering pipe according to a preferred embodiment of the present disclosure.

FIG. 4 is a schematic view of a spray filtering pipe according to a preferred embodiment of the present disclosure. As shown in FIG. 4, the spray filtering pipe is provided with a spray inlet 3-1, a filtering module 3-2 and a spray port 3-3. The internal filtering module in the spray filtering pipe is used to filter the residual fine solid particles in the gas phase. At the same time, a spray head is provided above the spray port to enable countercurrent contact of the sprayed water droplets with the gas to reinforce scrubbing and prevent the filtering module from clogging.

EXAMPLES

The invention will be further illustrated with reference to the following specific Examples. It is nevertheless to be appreciated that these Examples are only intended to exemplify the invention without limiting the scope of the invention. The test methods in the following examples for which no specific conditions are indicated will be carried out generally under conventional conditions or under those conditions suggested by the manufacturers. Unless otherwise specified, all parts are parts by weight, and all percentages are percentages by weight.

Example 1

A gas cooling-scrubbing apparatus according to the present disclosure was used in a delayed coking and decoking device. A cyclone jet scrubbing unit, a spray scrubbing unit, a filtering spray unit, and a coalescing dehydration unit were provided to scrub the coke powder in the gas phase.

(1) Process Conditions

The average particle size of the coke powder in the gas phase was 20 µm, the mass concentration was about 250 mg/m$^3$, and the gas intake was 200,000 m$^3$/h.

(2) Process Flow and Apparatus

The process flow is shown in FIG. 1, wherein the filter was a bag filter. The apparatus is shown in FIG. 2, wherein 250 cyclone jet scrubbing monopipes and 250 spray filtering pipes were provided, and the fresh water supplement was 2 vol % of the gas intake.

(3) Application Effect

The mass concentration of the coke powder in the gas phase was reduced to no more than 10 mg/m$^3$.

Example 2

A gas cooling-scrubbing apparatus according to the present disclosure was used in a flexicoking and flexible coking gas decoking device. A cyclone jet scrubbing unit, a spray scrubbing unit, a filtering spray unit, and a coalescing dehydration unit were provided to scrub the coke powder in the gas phase.

(1) Process Conditions

The average particle size of the coke powder in the flexible coking gas was 10 μm, the mass concentration was about 50 mg/m$^3$, the gas intake was 300,000 m$^3$/h, and the gas temperature was 91° C.

(2) Process Flow and Apparatus

The process flow is shown in FIG. 1, wherein the filter was a bag filter. The apparatus is shown in FIG. 2, wherein 400 cyclone jet scrubbing monopipes and 400 spray filtering pipes were provided, and the fresh water supplement was 2 vol % of the gas intake.

(3) Application Effect

The mass concentration of the coke powder in the gas phase was reduced to no more than 10 mg/m$^3$, and the temperature was decreased to not higher than 50° C.

The Examples listed above are only preferred examples in the disclosure, and they are not intended to limit the scope of the disclosure. Equivalent variations and modifications according to the disclosure in the scope of the present application for invention all fall in the technical scope of the disclosure.

All of the documents mentioned in the disclosure are incorporated herein by reference, as if each of them were incorporated herein individually by reference. It is to be further understood that various changes or modifications to the invention can be made by those skilled in the art after reading the above teachings of the invention, and these equivalent variations fall in the scope defined by the accompanying claims of the application as well.

What is claimed is:

1. A gas cooling-scrubbing apparatus, comprising, in sequence of gas flow: a cyclone jet scrubbing unit, a spray scrubbing unit, a filtering spray unit and a coalescing dehydration unit, wherein the cyclone jet scrubbing unit comprises at least one cyclone jet scrubbing monopipe, a cyclone jet cooling water pipe, a cyclone jet pipe plate and a cyclone jet overflow pipe, wherein the cyclone jet scrubbing monopipe includes a jetting region and a cyclone region, wherein the jetting region is provided with, in sequence, a cyclone jet inlet for receiving gas, a nozzle for spraying water into the gas, a contraction section, a mixing section, and an diffuser section, and wherein the cyclone region of the cyclone jet scrubbing monopipe is provided with a tangential inlet, a cyclone pipe, a sedimentation outlet near the bottom of the cyclone pipe, a cyclone jet pipe and a bubble cap for discharging gas from the cyclone jet scrubbing monopipe;

wherein the spray scrubbing unit is configured to receive gas discharged from the cyclone jet scrubbing monopipe, wherein the spray scrubbing unit comprises a spray filtering pipe, a spray pipe plate, a spray overflow pipe, a scrubbing nozzle oriented to discharge water into the upper portion of the spray filtering pipe, and a scrubbing nozzle water pipe, wherein the spray filtering pipe comprises a spray inlet for receiving gas from the cyclone jet scrubbing monopipe, a spray port for discharging gas, and an internal filtering module located inside the spray filtering pipe between the spray inlet and spray port for filtering the gas moving through the spray filtering pipe;

wherein the filtering spray unit comprises a filtering bed, a spray head disposed above the filtering bed and a spray water pipe; and wherein the coalescing dehydration unit comprises a coalescing bed, and wherein the coalescing bed is located below a gas phase outlet of the gas cooling-scrubbing apparatus.

2. The apparatus of claim 1, wherein the contraction section of the cyclone jet scrubbing monopipe has an angle of greater than 10° and less than 45°, the diffuser section has an angle of greater than 2° and less than 20°, and the nozzle has a spray angle of greater than 10° and a spray range covering the entire contraction section.

3. The apparatus of claim 1, wherein the spray port is an expanding outlet having an expanding angle of less than or equal to 10°, and the internal filtering module has a filter fineness of 10-200 mesh.

4. The apparatus of claim 1, wherein the filtering bed of the filtering spray unit has a filter fineness of 200-2000 mesh.

5. The apparatus of claim 3, wherein the scrubbing nozzle and the spray filtering pipe are arranged in one-to-one correspondence and concentrically; the scrubbing nozzle has a spray angle of greater than 20°; a distance from the scrubbing nozzle to the spray port is greater than an outlet diameter D of the spray port; and a spray range covers the whole spray port of the spray filtering pipe.

6. A gas cooling-scrubbing method, comprising the following steps:

(a) feeding a dusty gas into a cyclone jet scrubbing unit from a gaseous phase inlet, wherein the gas enters a jetting region of a cyclone jet scrubbing monopipe from a cyclone jet inlet, and is fully mixed with and cooled by scrubbing water sprayed from a nozzle in a contraction section, a mixing section and an diffuser section; wherein after solid particles are captured by atomized droplets to form a liquid-solid combinant, the combinant enters a cyclone region of the cyclone jet scrubbing monopipe through a tangential inlet; wherein the liquid-solid combinant sinks under an action of centrifugal force in a cyclone pipe and is discharged from a sedimentation outlet; and wherein the gas treated by cyclone jetting rises, is discharged from a cyclone jet pipe and enters a spray scrubbing unit;

(b) allowing the gas treated by cyclone jetting to enter a spray filtering pipe, wherein the spray filtering pipe is provided with a spray inlet, a spray port, and an internal filtering module located inside the spray filtering pipe between the spray inlet and spray port, wherein the gas enters the spray filtering pipe via the spray inlet in the spray scrubbing unit, wherein after the gas is further filtered by the internal filtering module, the gas is discharged upward from the spray port at a reduced rate; wherein high-pressure scrubbing water is sprayed downward from a scrubbing nozzle, and collides with the rising gas to further cool and scrub the gas; and wherein at the same time, tiny solid particles in the internal filtering module are detached from the internal filtering module by backwash of the high-pressure scrubbing water to increase a service life of the internal filtering module;

(c) allowing the gas treated by spray scrubbing in step (b) to enter a filtering spray unit, wherein a spray head disposed above a filtering bed sprays cooling-scrubbing water downward to further reinforce a cooling-scrubbing effect;

(d) allowing the gas treated by filtering spray in step (c) to enter a coalescing dehydration unit, wherein a coalescing bed captures tiny droplets in the gas to prevent the gas phase from entraining droplets into a downstream device, and the treated gas is discharged from a gas phase outlet.

7. The method of claim 6, wherein waste scrubbing water is discharged from a liquid discharge port; circulating water flows out from a circulating water outlet; the solid particles in the circulating water are filtered through a filter; and at the same time, fresh water is replenished through a circulating water outlet pipeline.

8. The method of claim 7, wherein a liquid phase at a bottom of the cyclone jet scrubbing unit forms a liquid seal at the sedimentation outlet of the cyclone jet scrubbing monopipe to drive the gas to enter the cyclone jet scrubbing monopipe from the cyclone jet inlet; a gas treating capacity of the cyclone jet scrubbing monopipe is not more than 1000 $m^3/h$; and a fresh water supplement is 0.5-5 vol % of a gas intake.

9. The method of claim 6, wherein a flow volume of scrubbing water in the nozzle of the cyclone jet scrubbing monopipe is 0.2-2 vol % of a volume of the gas to be treated; a flow volume of high-pressure scrubbing water in the scrubbing nozzle of the spray scrubbing unit is 1-5 vol % of the volume of the gas to be treated; and a flow volume of the cooling-scrubbing water in the spray head of the filtering spray unit is 2-10 vol % of the volume of the gas to be treated.

* * * * *